United States Patent
Ikeda et al.

(10) Patent No.: US 6,704,029 B1
(45) Date of Patent: Mar. 9, 2004

(54) METHOD AND APPARATUS FOR SPECIFYING SCENE INFORMATION IN A MOVING PICTURE

(75) Inventors: Kazuyo Ikeda, Yokohama (JP); Hirotaka Shiiyama, Machida (JP); Hiroshi Tojo, Fuchu (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/547,342

(22) Filed: Apr. 11, 2000

(30) Foreign Application Priority Data

Apr. 13, 1999 (JP) .............................. 11-105767

(51) Int. Cl.[7] .................................................. G09G 5/00
(52) U.S. Cl. ........................ 345/723; 345/719; 386/4; 386/52
(58) Field of Search ................. 345/716, 719, 345/720, 721, 723; 386/4, 52; 348/700, 701

(56) References Cited

U.S. PATENT DOCUMENTS

| | | | |
|---|---|---|---|
| 5,537,528 A | * 7/1996 | Takahashi et al. | ........... 715/512 |
| 5,553,221 A | * 9/1996 | Reimer et al. | ............... 345/720 |
| 5,606,690 A | 2/1997 | Hunter et al. | |
| 6,400,853 B1 | * 6/2002 | Shiiyama | ..................... 382/305 |
| 6,487,360 B1 | * 11/2002 | Sumiyoshi et al. | ........... 386/52 |
| 6,526,215 B2 | * 2/2003 | Hirai et al. | ..................... 386/52 |

FOREIGN PATENT DOCUMENTS

| | | |
|---|---|---|
| EP | 0-866 409 | 9/1998 |
| JP | 8-241335 | 8/1996 |
| JP | 10-260983 | 9/1998 |

\* cited by examiner

*Primary Examiner*—John Cabeca
*Assistant Examiner*—Brian Detwiler
(74) *Attorney, Agent, or Firm*—Fitzpatrick, Cella, Harper & Scinto

(57) ABSTRACT

In an image processing apparatus, a moving picture storage module stores moving picture data. A scene designation module designates at least one scene in the moving picture data, and sets a key frame and importance level of the designated scene. A frame feature extraction module acquires an image feature amount of the designated key frame. A scene feature information storage module generates scene feature information including the duration, key frame, importance level, and image feature amount of the key frame of the scene designated by the scene designation module, and stores the generated information in a memory in correspondence with the moving picture data. Based on the scene feature information, digest playback for playing back only principal part of the designated moving picture data is executed, or desired moving picture data is found by a similar image search using the key frame.

56 Claims, 15 Drawing Sheets

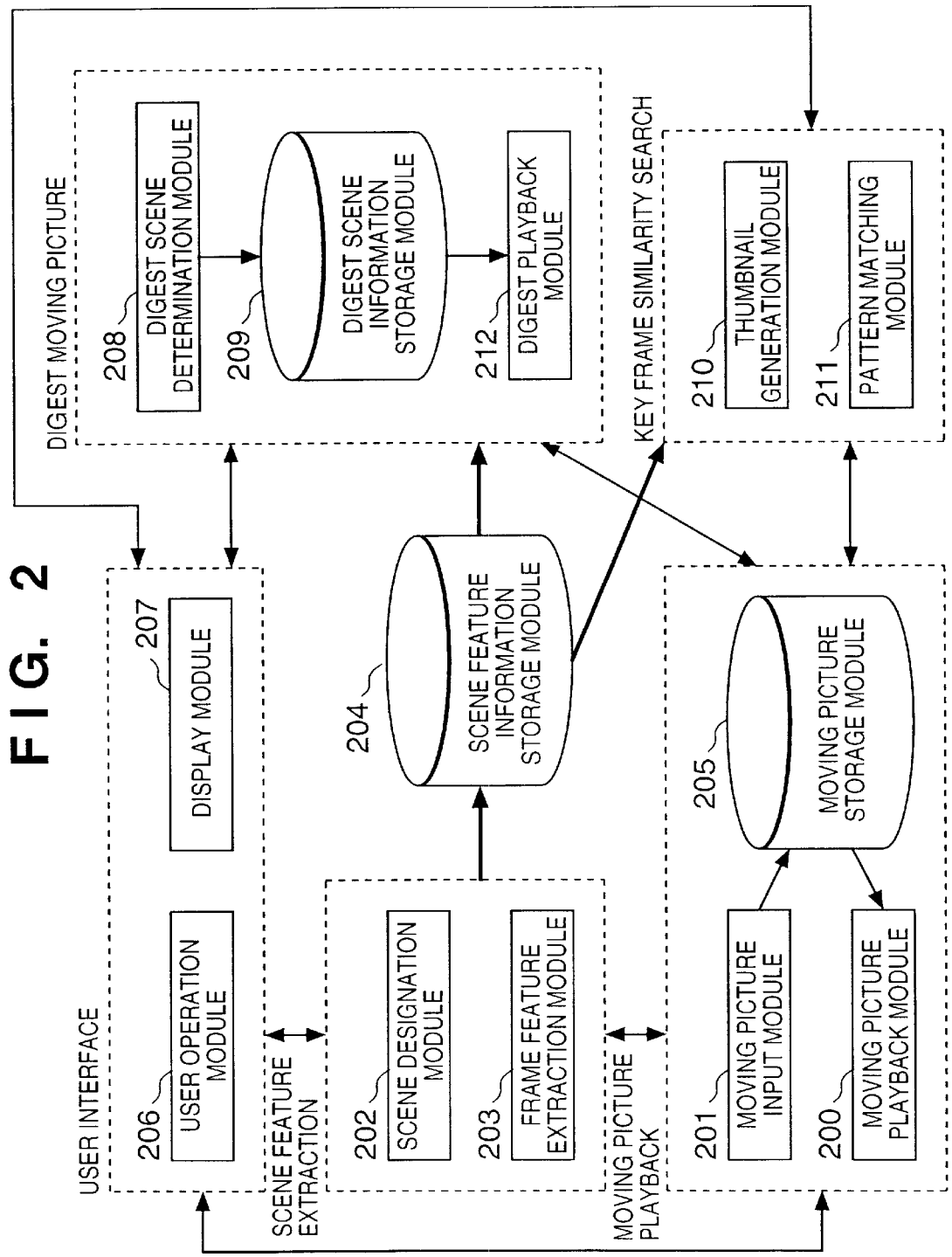

FIG. 3A

SCENE FEATURE

| START FRAME NUMBER |
| --- |
| KEY FRAME NUMBER |
| END FRAME NUMBER |
| IMPORTANCE LEVEL OF SCENE |
| COLOR LAYOUT OF KEY FRAME |

FIG. 3B

COLOR LAYOUT OF KEY FRAME

| NUMBER OF SEGMENTED BLOCKS ( POWER OF 2 ) |
| --- |
| COLOR FEATURE EXTRACTION METHOD |
| COLOR DATA FORMAT |
| LABEL SEQUENCE |

FIG. 3C

COLOR DATA FORMAT

| COLOR SPACE |
| --- |
| COLOR DEPTH |
| COLOR MAP |

FIG. 7

| MOVING PICTURE ID | SCENE ID | SCENE FEATURE |
|---|---|---|
| 0 | 0 | SCENE FEATURE 0 |
| 0 | 1 | SCENE FEATURE 1 |
| 0 | 2 | SCENE FEATURE 2 |
| 1 | 0 | SCENE FEATURE 3 |
| 1 | 1 | SCENE FEATURE 4 |
| ⋮ | ⋮ | ⋮ |

FIG. 11

| MOVING PICTURE ID | SCENE ID | START FRAME NUMBER | END FRAME NUMBER |
|---|---|---|---|
| 0 | 0 | 50 | 55 |
| 0 | 1 | 110 | 125 |
| 0 | 2 | 300 | 308 |
| 0 | 3 | 411 | 416 |
| 1 | 0 | 20 | 25 |
| ⋮ | ⋮ | ⋮ | ⋮ |

FIG. 14

|   | 1 | 2 | 3 | 4 | 5 | 6 | 7 | 8 | · · · · |
|---|---|---|---|---|---|---|---|---|---------|
| 1 | 0 | 1 | 1 | 5 | 1 | 5 | 7 | 7 | · · · · |
| 2 |   | 0 | 2 | 1 | 1 | 7 | 2 | 5 | · · · · |
| 3 |   |   | 0 | 7 | 1 | 1 | 5 | 2 | · · · · |
| 4 |   |   |   | 0 | 1 | 9 | 1 | 7 | · · · · |
| ⋮ |   |   |   |   |   |   |   |   |         |

METHOD AND APPARATUS FOR SPECIFYING SCENE INFORMATION IN A MOVING PICTURE

FIELD OF THE INVENTION

The present invention relates to an image processing apparatus and method for storing moving picture data in a format that allows easy search of moving picture data.

BACKGROUND OF THE INVENTION

In recent years, along with the advance of moving picture data compression techniques such as MPEG and the like and the advent of recording media with larger capacities, moving picture data can be distributed using, e.g., the Internet. Also, even end users can store a large number of digital image data.

When the operator selects a moving picture he or she wants to see from a large number of moving picture data, he or she must check the contents by playing back moving picture data one by one at double speed or repeating fast-forwarding and playback.

However, in such conventional method, the user must spend much labor and time due to troublesome operations until he or she finds a desired moving picture.

SUMMARY OF THE INVENTION

The present invention has been made in consideration of the above problems, and has as its object to provide an image processing apparatus and method, which can easily and adequately confirm the contents of moving picture data.

It is another object of the present invention to provide a data structure suitable for achieving the above object.

It is still another object of the present invention to allow an easy search to obtain desired moving picture data.

In order to achieve the above object, an image processing apparatus of the present invention comprises, e.g., the following arrangement. That is, there is provided an image processing apparatus comprising:

specifying means for specifying at least one desired scene in moving picture data, and a frame serving as a key frame in the desired scene;

setting means for setting an importance level of the desired scene specified by the specifying means; and storage means for storing information indicating the scene and key frame specified by the specifying means and the importance level set by the setting means as scene information in association with the moving picture data.

The image processing apparatus preferably further comprises acquisition means for acquiring feature amount information of the key frame, the scene information stored in the storage means includes the feature amount information of the key frame image acquired by the acquisition means, and the apparatus also comprises:

computation means for computing a similarity value between images of a designated key frame and another key frame on the basis of image feature amounts of the key frames when one key frame is designated;

presentation means for presenting key frames on the basis of similarity values computed by the computation means; and playback means for acquiring and playing back moving picture data including the key frame selected from the key frames presented by the presentation means.

Also, preferably, the scene information includes an image feature amount of an image of each key frame, and the apparatus further comprises:

generation means for generating extracted moving picture data, which can be played back as a moving picture, on the basis of the scene information stored in the storage means;

computation means for computing a similarity value between images of a designated key frame and another key frame on the basis of image feature amounts of the key frames when one key frame is designated;

presentation means for presenting key frames on the basis of similarity values computed by the computation means; and playback means for playing back the extracted moving picture data generated by the generation means in association with the moving picture data which includes the key frame selected from the key frames presented by the presentation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the functional arrangement of the image processing apparatus of the first embodiment;

FIGS. 3A to 3C show the data structure of scene feature data stored in the image processing apparatus of the first embodiment;

FIG. 7 shows an example of scene feature information;

FIG. 11 shows an example of the data format of digest scene information according to the first embodiment;

FIG. 14 shows an example of a penalty matrix used to compute a similarity value between label sequences.

DETAILED DESCRIPTION OF THE PREFERRED EMBODIMENTS

Preferred embodiments of the present invention will now be described in detail in accordance with the accompanying drawings.

First Embodiment

Figure 1:
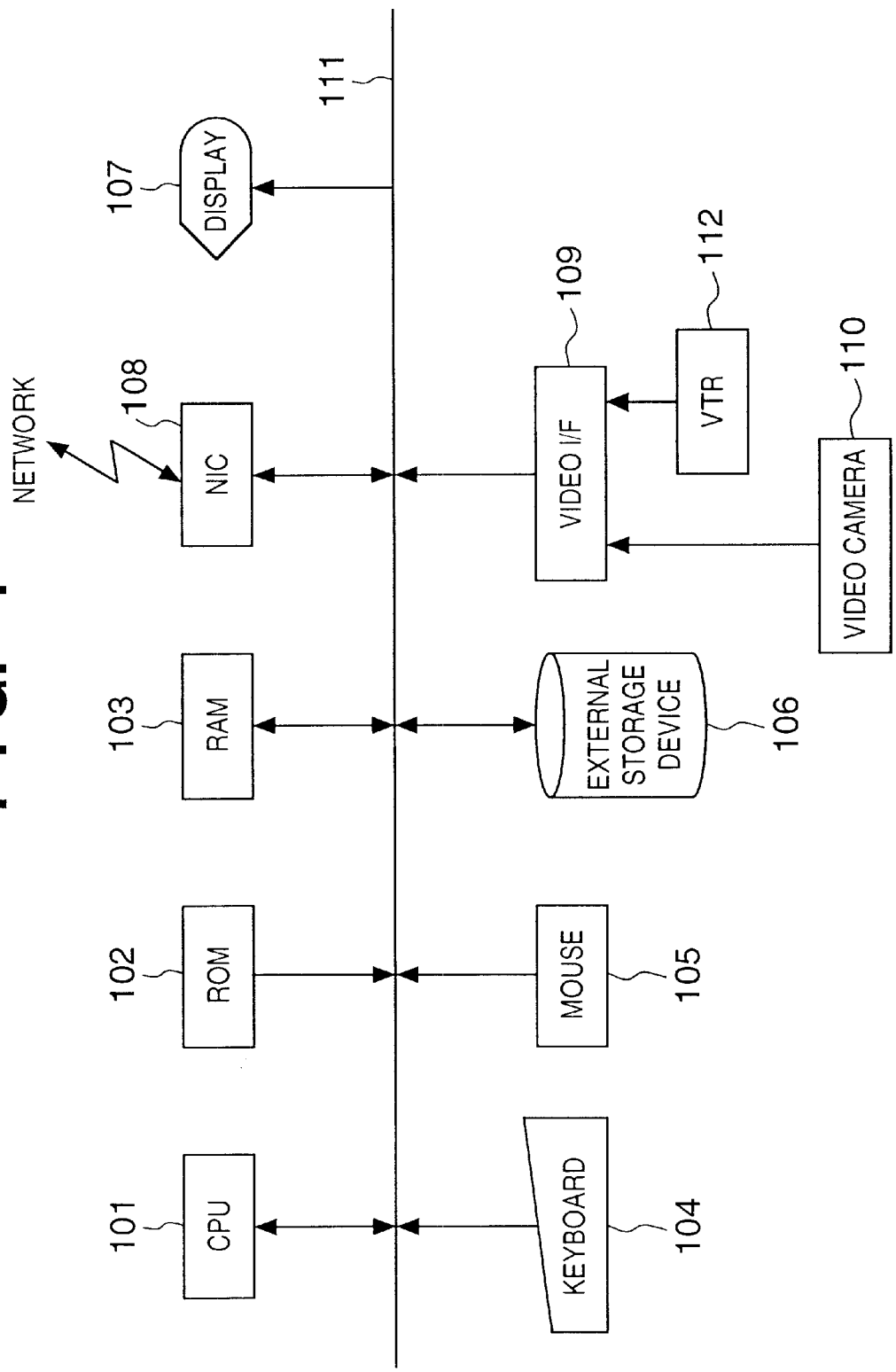
FIG. 1 is a block diagram showing the control arrangement of an image processing apparatus according to the first embodiment of the present invention.

FIG. 1 is a block diagram showing the control arrangement of an image processing apparatus of this embodiment. Referring to FIG. 1, reference numeral 101 denotes a CPU which executes various kinds of control in the image processing apparatus of this embodiment. Reference numeral 102 denotes a ROM which stores a boot program executed upon starting up the apparatus, and various data. Reference numeral 103 denotes a RAM which stores control programs to be processed by the CPU 101, and provides a work area used when the CPU 101 executes various kinds of control. Reference numeral 104 denotes a keyboard; and 105, a mouse, which provides various input operation environments for the user.

Reference numeral 106 denotes an external storage device which comprises a hard disk, floppy disk, CD-ROM, or the like. Reference numeral 107 denotes a display which comprises a CRT display, liquid crystal display, or the like, and makes various kinds of display under the control of the CPU 101. Reference numeral 108 denotes a network interface which allows communications with devices on a network. Reference numeral 109 denotes a video interface which allows to capture moving picture data from a video camera 110 or VTR 112. Reference numeral 111 denotes a bus for connecting the aforementioned building components.

Note that the video camera 110, VTR 112, and external storage device 106 in the above arrangement may use the ones connected on the network.

FIG. 2 is a block diagram showing the functional arrangement of the image processing apparatus of this embodiment. Referring to FIG. 2, reference numeral 201 denotes a moving picture input module for capturing an image from the video camera 110, VTR 112, or the like via the video interface 109, or capturing a moving picture from the device on the network via the network interface 108. Reference numeral 205 denotes a moving picture storage module for storing all frames of the moving picture captured by the moving picture input module 201. Reference numeral 200 denotes a moving picture playback module for playing back a moving picture by sequentially reading out moving picture frames from the moving picture storage module 205 on the basis of a designated frame number.

Reference numeral 207 denotes a display module for displaying a moving picture played back by the moving picture playback module 200 and a thumbnail image generated by a thumbnail generation module 210 to the user via the display 107. A user operation module 206 includes the keyboard 104 and mouse 105, which are used by the user to issue a moving picture playback instruction, random display instruction, similarity search instruction, digest playback instruction, and the like.

Reference numeral 202 denotes a scene designation module which designates the start, end, and key frames of an important scene. Reference numeral 203 denotes a frame feature extraction module for extracting a color layout from the key frame designated by the scene designation module 202. Note that this embodiment uses a label sequence obtained by converting feature amounts of a plurality of blocks obtained by segmenting a frame image into labels, and arranging them in a predetermined rule, as disclosed in Japanese Patent Laid-Open No. 10-260983. Reference numeral 204 denotes a scene feature information storage module which stores data designated by the scene designation module 202 and the color layout extracted by the frame feature extraction module 203 together in a single data structure.

Reference numeral 208 denotes a digest scene determination module which determines a digest scene with reference to the contents of the scene feature information storage module 204. Reference numeral 209 denotes a digest scene information storage module, which stores digest scene information determined by the digest scene determination module 208. Reference numeral 212 denotes a digest playback module which plays back a digest via the moving picture playback module 200 with reference to the contents of the digest scene information storage module 209.

Reference numeral 210 denotes a thumbnail generation module which generates a thumbnail image by reducing the key frame image designated by the scene designation module 202. Reference numeral 211 denotes a pattern matching module for matching label sequences of color layouts of key frames.

FIGS. 3A to 3C show the data structure of scene feature data stored in the image processing apparatus of this embodiment. The scene feature information storage module 204 stores scene feature data shown in FIG. 3A in correspondence with moving picture data from which that scene feature data is extracted. In the scene feature data, a start frame number is the frame number of the start frame of that scene. An end frame number is the frame number of the end frame of that scene. Scene importance indicates the importance level of that scene in the moving picture. In this embodiment, the scene importance with respect to the entire moving picture is designated by, e.g., an integer which has a maximum value=100. The color layout of a key frame is a label sequence and its attribute, as described in Japanese Patent Laid-Open No. 10-260983, and will be described below.

Figure 4:
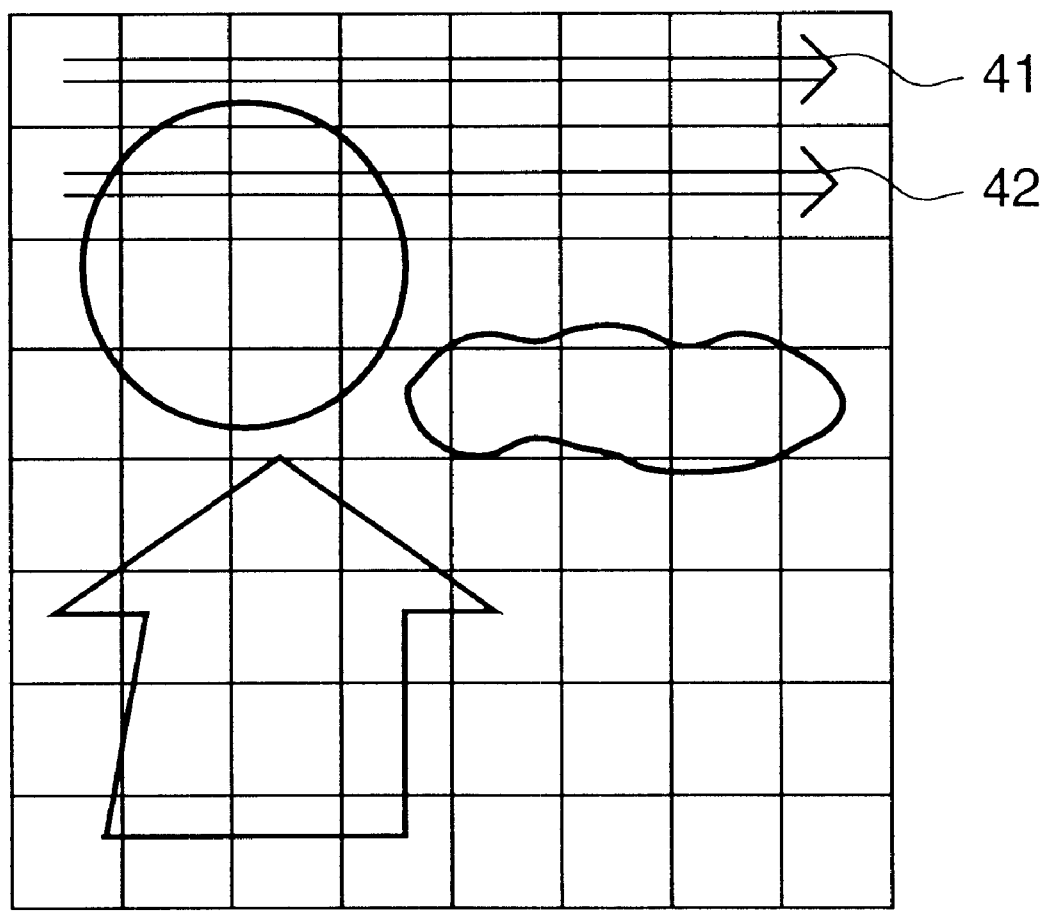
FIG. 4 shows an example of an image segmented into blocks according to the first embodiment.

FIG. 3B shows the data structure of the color layout of the key frame. FIG. 4 shows an example of an image segmented into blocks according to this embodiment. The "color layout of the key frame" in this embodiment will be described in detail below with reference to FIGS. 3B and 4.

In FIG. 3B, "number of segmented blocks" indicates that of an image. In this embodiment, an image is segmented into the same numbers of blocks in the vertical and horizontal directions, and the number of blocks is given by a power of 2 to express the number of segmented blocks. For example, when the numbers of segmented blocks in the vertical and horizontal directions are 8, since $8=2^3$, the number of segmented blocks is expressed by 3.

"Color feature extraction method" indicates the feature amount extraction method in each block obtained by segmenting an image. For example, the average color (average of colors of all pixels), or the most frequent color (color with a highest frequency of occurrence among all pixels) may be used.

"Color data format" indicates the format of color data. FIG. 3C shows the data structure of the color data format.

"Color space" is a space for expressing color; for example, an RGB space, L*u*v* space, and the like. "Color depth" is the number of bits used to express one pixel; for example, information such as 32 bits/pixel, 24 bits/pixel, 16 bits/pixel, and the like. "Color map" is a map which defines correspondences between the color numbers and actual colors. Note that the "color map" is not always necessary.

Referring back to FIG. 3B, "label sequence" is a sequence of labels assigned in accordance with feature amounts acquired from the individual blocks. The number of labels is determined by the number of segmented blocks. A method of generating a label sequence will be explained below.

Figure 5:
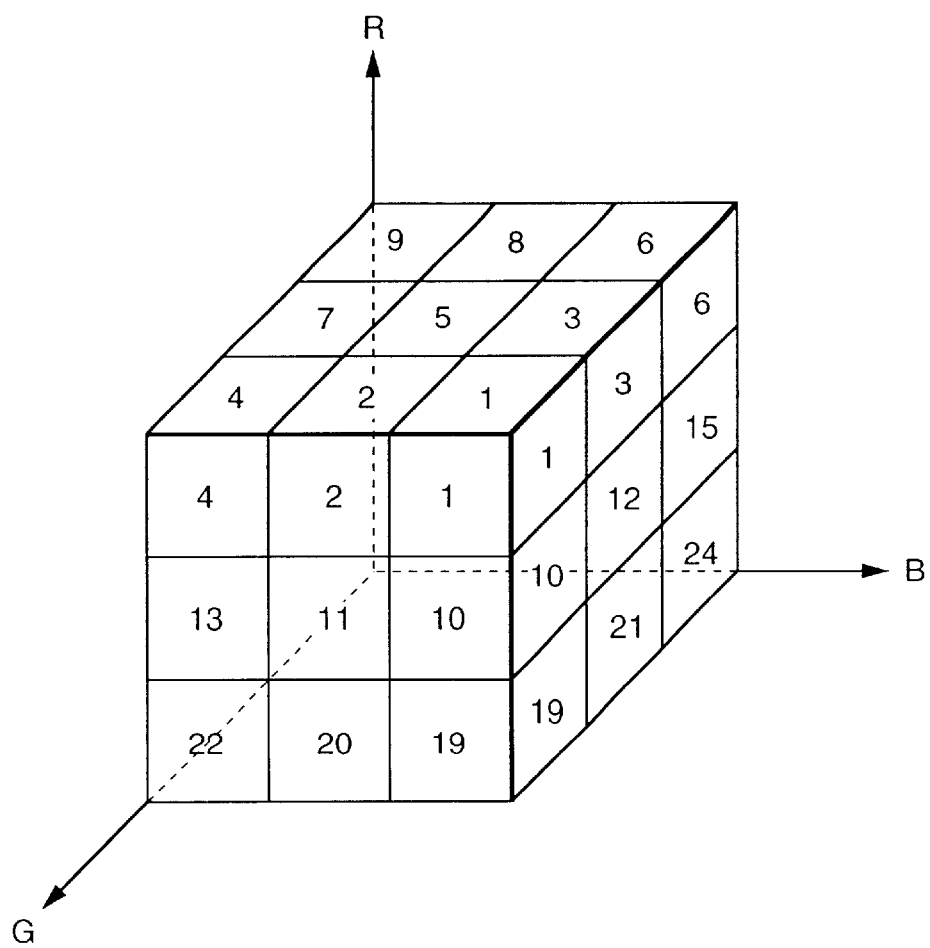
FIG. 5 is a view for explaining a multi-dimensional feature amount space according to the first embodiment.

FIG. 5 is a view for explaining a multi-dimensional feature amount space according to this embodiment. As shown in FIG. 5, the multi-dimensional feature amount space (RGB color space) is segmented into a plurality of color cells, and unique labels are assigned as serial numbers to the individual color cells. The reason why the multi-dimensional feature amount space (RGB color space) is segmented into a plurality of blocks is to absorb delicate feature amount (color) differences. As for the multi-dimensional feature amount space, in place of directly using image feature amounts, the respective parameters may be normalized (standardized) by obtaining the average and variance by experiments, and after that, they may undergo orthogonal transformation such as main component analysis or the like to be transformed into a significant dimension. Note that the "significant dimension" is defined by a main component axis with a large contribution ratio.

Each block obtained by segmenting the key frame image undergoes an image feature amount computation defined by "color feature extraction method" to determine the cell on the multi-dimensional feature amount space to which that block belongs, thus obtaining a corresponding label. This process is done for all blocks. For example, when "most frequent color" is set as "color feature extraction method", a computation for determining color cells to which all pixels in a given block belong is made, and the label of the color cell with the highest frequency of occurrence is determined as a label of that segmented image block. This process is repeated for all blocks.

After parameter labels are assigned to the individual blocks, they are arranged in a predetermined block order to generate a label sequence. For example, as indicated by arrows 41 and 42 in FIG. 4, parameter labels are arranged by scanning left to right, up to down.

An example of the operation of the image processing apparatus of this embodiment with the above arrangement will be explained below.

Scene Feature Extraction Process

A process for extracting information that pertains to an important scene from a moving picture, and storing it as scene feature data (FIG. 3A) will be explained first.

Figure 6:
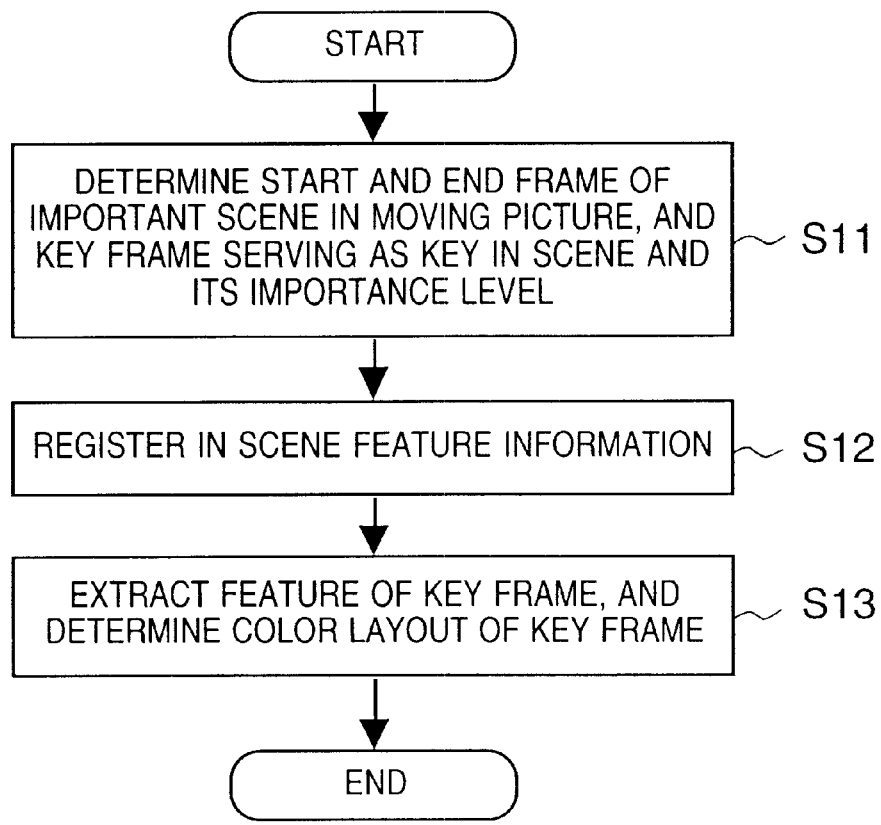
FIG. 6 is a flow chart showing the sequence of a registration process according to the first embodiment.

FIG. 6 is a flow chart showing the sequence of a registration process according to this embodiment. In step S11, the scene designation module 202 determines the start and end frames of an important scene in a moving picture, and a key frame serving as a key of that scene, and also determines the importance level of that scene. This process may be done manually or automatically using some arithmetic operations. A case will be exemplified below wherein the importance level of a given scene is determined manually.

The moving picture playback module 200 reads out a moving picture input by the moving picture input module 201 and stored in the moving picture storage module 205. The module 200 plays back, fast-forwards, rewinds, and so forth the readout moving picture in accordance with user's instructions input via the user operation module 206. The user observes an image played back on the display module 207 and designates an important scene. For example, the user designates the start and end scenes (frames) of that important scene while playing back an image, and also designates a scene (frame) that expresses that scene best in the important scene as a key frame.

The scene designation module 202 obtains the frame numbers of the start and end frames and of the key frame designated by the user operation module 206. Furthermore, the importance level of that scene with respect to the entire moving picture is designated using an integer having 100 as a maximum value. The individual values obtained in this manner are stored in the format of scene feature data shown in FIG. 3A by the scene designation module 202.

The obtained scene feature data is stored as scene feature information in the scene feature information storage module 204 together with the ID of the moving picture of interest and a scene ID assigned from the beginning of the scene extracted from the moving picture in step S12. FIG. 7 shows an example of the scene feature information stored in the scene feature information storage module 204.

In step S13, the frame feature extraction module 203 sequentially extracts each key frame from the moving picture storage module 205 with reference to the contents of the scene feature information storage module 204, extracts a feature associated with color to determine "color layout of key frame", and stores it in the scene feature information storage module 204. The process for determining the color layout is as described above, and details thereof are described in Japanese Patent Laid-Open No. 10-260983. This process is repeated for all key frame numbers contained in the scene feature information.

In this manner, scene feature data (FIGS. 3A to 3C) are extracted in correspondence with all the scenes designated by the user, and are stored as scene feature information in the scene feature information storage module 204. The scene feature extraction process explained above is repeated for all moving pictures of interest.

Digest Moving Picture Generation Process

Figure 8:
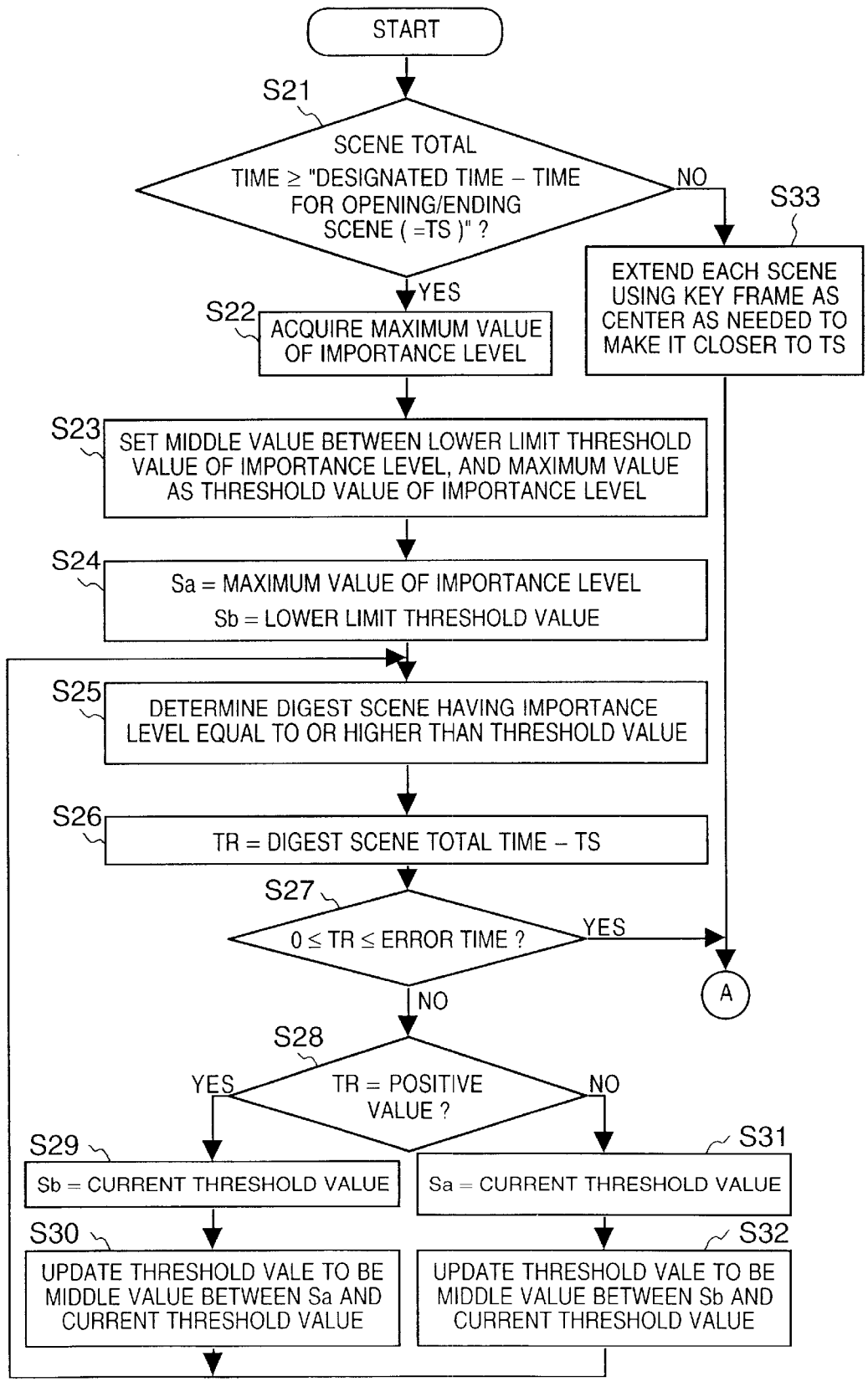
FIG. 8 is a flow chart showing the sequence of a digest moving picture generation process according to the first embodiment.
Figure 9:
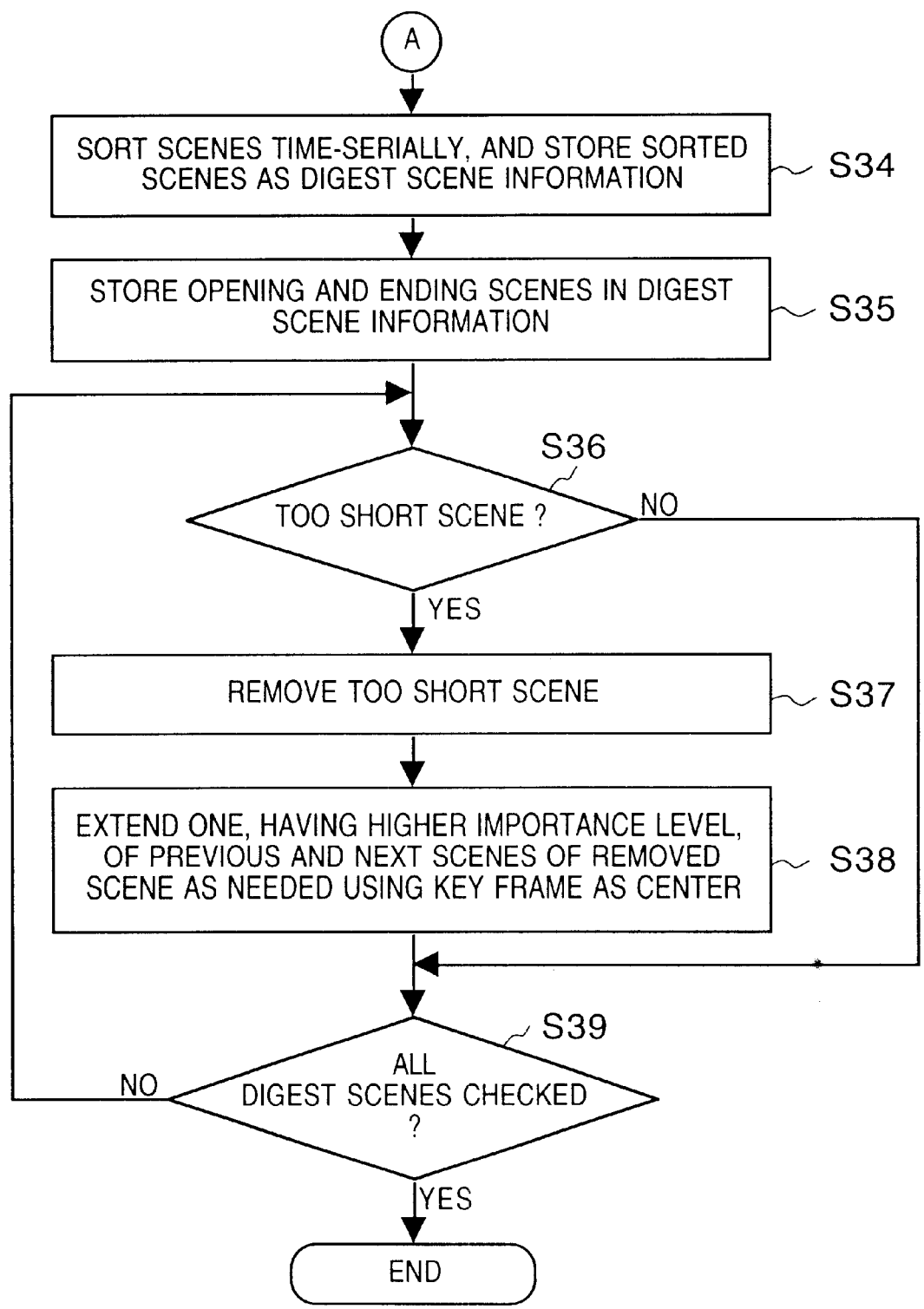
FIG. 9 is a flow chart showing the sequence of a digest moving picture generation process according to the first embodiment.

A process for automatically generating a digest moving picture for each moving picture on the basis of the scene feature information will be explained below. FIGS. 8 and 9 are flow charts showing the sequence of a digest moving picture generation process (for one moving picture) according to this embodiment.

In step S21, the digest scene determination module 208 computes the total time from the start and end frame numbers of all scene feature data having an identical moving picture ID with reference to the contents of the scene feature information storage module 204. The module 208 compares this total time and the time (represented by TS hereinafter) obtained by subtracting the time required for the opening and ending scenes of the moving picture from a digest moving picture playback time designated by the user. The reason why the time required for the opening and ending scenes is subtracted from the designated time is based on the concept that a digest moving picture always includes the opening and ending scenes of the moving picture. The time for the opening and ending scenes is determined to have an optimal duration that does not dazzle the human eye on the basis of the visual characteristics of a human being.

Therefore, this time duration is not particularly limited, and is preferably set on the order of several seconds. Note that the opening and ending scenes need not always be included.

If it is determined in step S21 that the scene total time is longer than the designated time, processes in step S22 and subsequent steps are executed to adjust the scene total time to the designated time.

In step S22, the maximum value of the importance levels of the scene feature data is acquired. In step S23, the middle value between the lower limit threshold value of the importance level and the maximum value is set as a threshold value of the importance level. Note that the lower limit threshold value of the importance level indicates minimum importance for which the user determines an important scene. Also, assume that the start and end frames of a scene determined to be an important scene have this importance. Note that the lower limit threshold value of the importance level is determined by experience, and is not particularly limited. In step S24, the maximum value of the importance level is set in Sa and the lower limit threshold value of the importance level is set in Sb as default values to prepare for a series of processes in subsequent steps S25 to S32.

Figure 10:
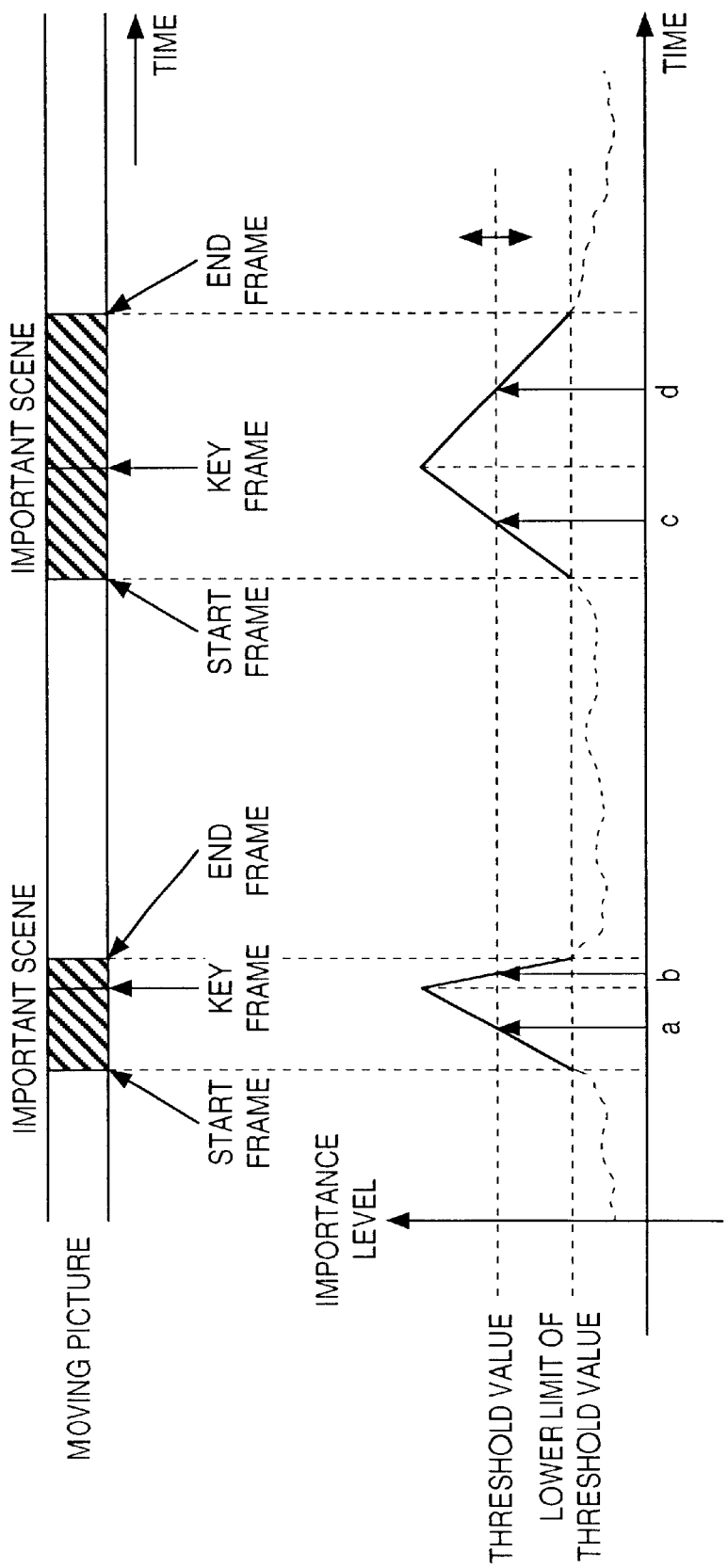
FIG. 10 depicts the relationship between the importance levels of scenes and threshold value in correspondence with a moving picture and its important scenes.

In step S25, a digest scene having an importance level equal to or higher than the threshold value is determined. This process will be described in detail below with reference to FIG. 10. FIG. 10 depicts a moving picture and its important scenes, and also shows a graph in which the abscissa plots time and the ordinate plots the importance level of a frame, in correspondence with those scenes. As described above, the importance level of the start and end frame of each important scene is assumed to match the lower limit value of the threshold value. Since the key frame best expresses that scene, the importance level of the scene amounts to be that of the key frame. Note that the importance levels of frames other than important scenes are indefinite (indicated by the dotted curve).

In this fashion, virtual lines can be drawn between the importance level of the start frame and that of the key frame, and between the importance level of the key frame and that of the end frame (the solid lines in FIG. 10). The intersections between these virtual lines of the importance level and threshold value are obtained, and frames present between these intersections are extracted as those with importance levels equal to or higher than the threshold value, thus determining digest scenes using these extracted frames. That is, in FIG. 10, frames (a) and (b), and frames (c) and (d) correspond to such frames, and are used as digest scenes.

In step S26, TS is subtracted from the total time of the digest scenes determined in step S25 to obtain TR. It is then checked in step S27 if TR is equal to or larger than zero and falls within an error time. Note that the error time is set assuming the case wherein TR does not equal zero (i.e., the total time of digest scenes does not match TS) independently of the position of the threshold value, and is obtained by experience. If TR is equal to or larger than the predetermined error time, the flow advances to step S28.

It is checked in step S28 if TR assumes a positive value. If YES in step S28, since this means that the total time of the digest scene is too long, the flow advances to step S29 to set the currently set threshold value in Sb. In step S30, the threshold value is updated to the middle value between Sa and the current threshold value. The flow then returns to step S25. That is, the currently set threshold value (the threshold value set in step S23 in the first process of step S29, or that set in step S30 in the second and subsequent processes) is set as the lower limit threshold value of the importance level, and the middle value between the newly set lower limit threshold value and the maximum value stored in Sa is set as a new threshold value, thus repeating the aforementioned processes in step S25 and subsequent steps.

On the other hand, if it is determined in step S28 that TR assumes a negative value, since this means that the total time of digest scenes is too short, the flow advances to step S31. In step S31, the current threshold value is set in Sa. In step S32, a threshold value is updated to the middle value between Sb and the current threshold value. The flow then returns to step S25. More specifically, the currently set threshold value (the threshold value set in step S23 in the first process of step S31, or that set in step S32 in the second and subsequent processes) is set as the maximum value of the importance level, and the middle value between the new maximum value and the lower limit value stored in Sb is set as a new threshold value, thus repeating the aforementioned processes in step S25 and subsequent steps.

In this manner, by repeating steps S25 to S32, the total time of digest scenes becomes closest to TS, and it is finally determined in step S27 that TR is equal to or larger than zero and is shorter than the predetermined time. Then, the flow advances to step S34.

On the other hand, if it is determined in step S21 that the total time of scenes is shorter than the designated time, since the digest moving picture time is shorter than the time designated by the user, the flow advances to step S33 to execute an exceptional process. In step S33, all important scenes of the moving picture registered in the scene feature information are extended as needed to have their key frames as the center to make the playback time of these important scenes close to TS. That is, frames are alternately added to the left and right sides of the designated scene including the key frame to extend each scene. The flow then advances to step S34.

In step S34, scenes extracted and determined as digest scenes are sorted time-serially, and are stored as digest scene information shown in, e.g., FIG. 11, in the digest scene information storage module 209. In step S35, the opening and ending scenes of the moving picture are respectively stored at the beginning and end of the digest scene information. At this time, if the frames of an important scene overlap those of the previous and next scenes, they are merged.

In step S36, the scenes of the digest scene information are examined in turn to check if too short a scene is included. Note that too short a scene is a scene having a playback time within which its contents cannot be discriminated by the human eye, and is determined based on the visual characteristics of a human being. In this embodiment, too short a scene is shorter the opening or ending scene. If too short a scene is found, it is removed from the digest scene information in step S37. In step S38, one having a higher importance level of the previous and next scenes of the scene removed in step S37 is extended to have its key frame as needed (as in step S33) to fill the removed time. It is checked in step S39 if all the scenes in the digest scene information have been checked, and steps S36 to S38 are repeated until all the scenes are checked.

By playing back the individual scenes in turn from the digest scene information obtained by the aforementioned process, a digest moving picture of given moving picture data can be obtained. The digest moving picture generation process explained above is done for all moving pictures of interest.

Moving Picture Search Process

Figure 12:
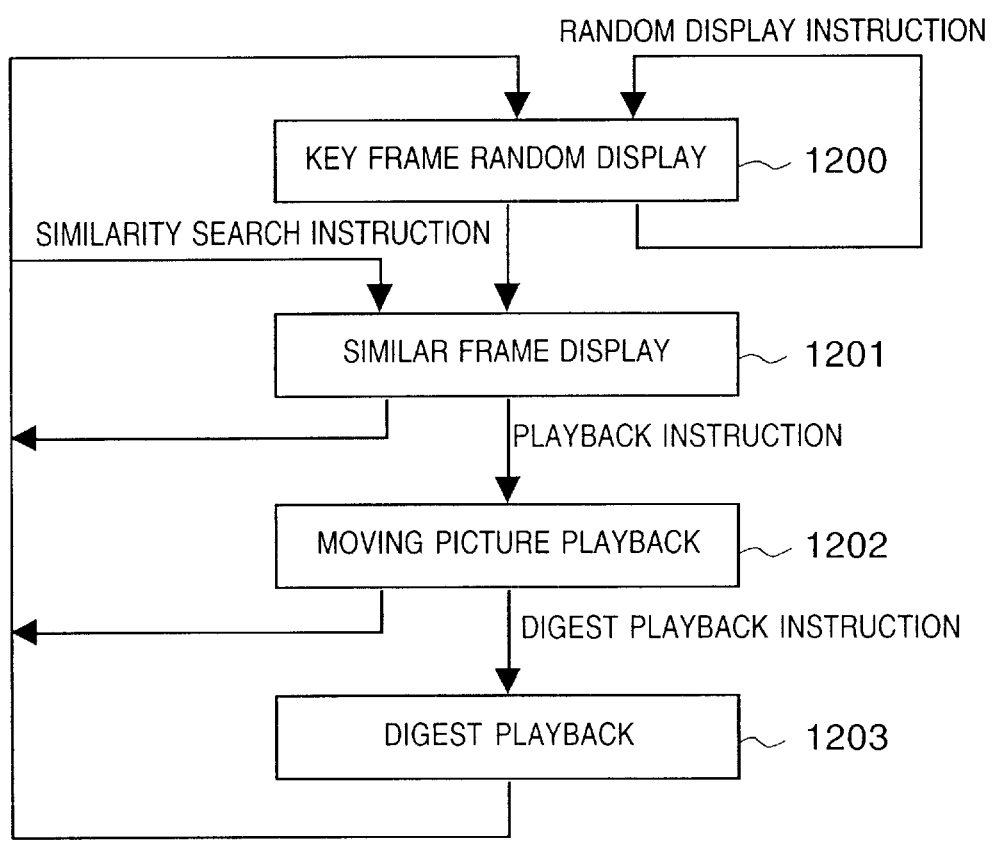
FIG. 12 is a state transition chart in typical user operations upon moving picture search of the first embodiment.
Figure 13:
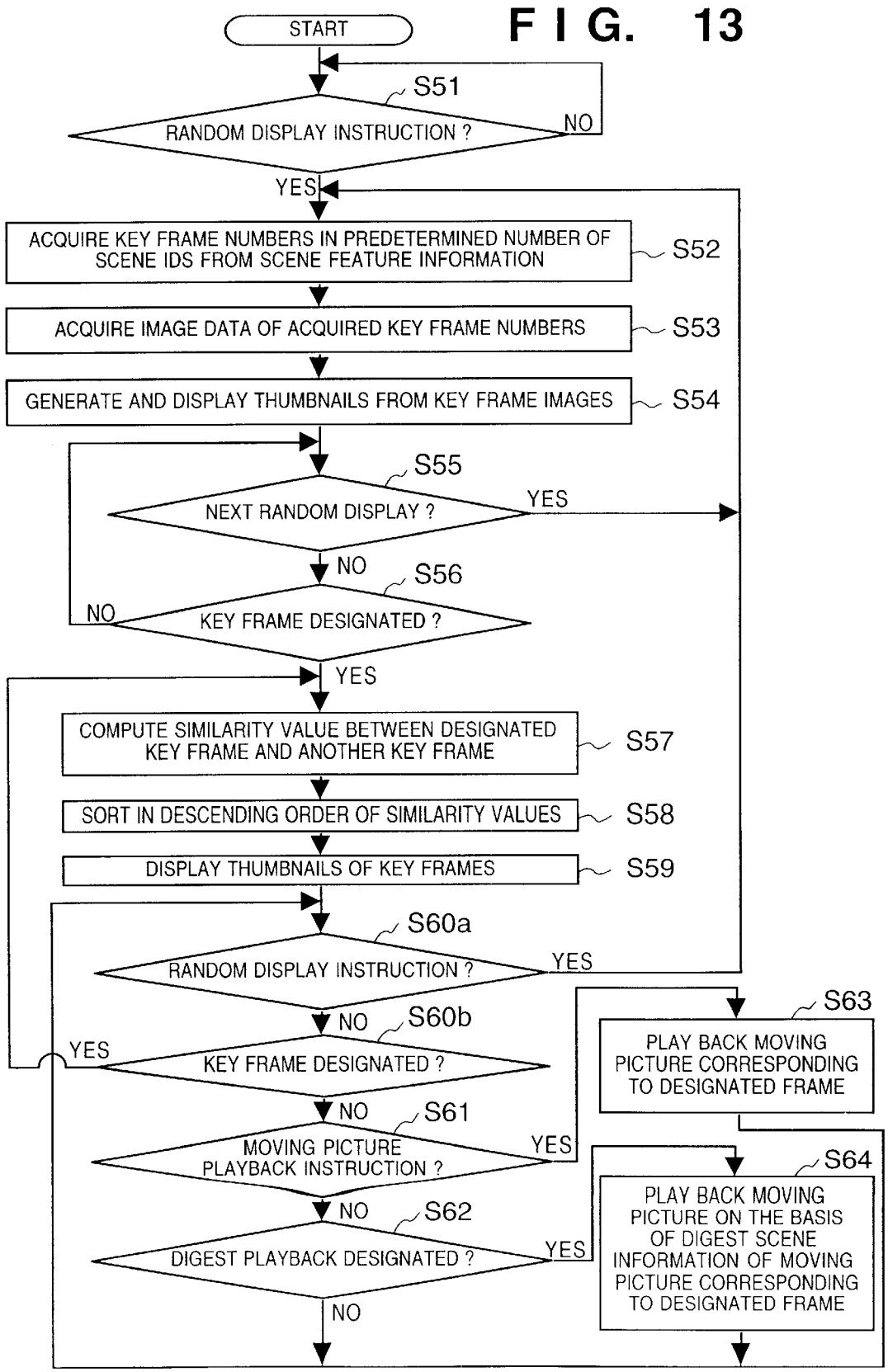
FIG. 13 is a flow chart for explaining the moving picture search process according to the first embodiment.

A process executed when the user searches for a desired moving picture will be explained below. FIG. 12 is a state transition chart in typical user operations upon a moving picture search in this embodiment. FIG. 13 is a flow chart for explaining the moving picture search process according to this embodiment.

When the user designates a random display mode via the user operation module 206, the flow advances from step S51 to step S52, thus setting a key frame random display state 1200. At this time, the thumbnail generation module 210 extracts key frame numbers included in a predetermined number of scene IDs with reference to the scene feature information stored in the scene feature information storage module 204 (step S52), and extracts key frame images from the moving picture storage module 205 based on the key frame numbers (step S53). The module 210 reduces the extracted key frame images to generate thumbnails, and randomly displays them via the display module 207 (step S54). Note that the predetermined number in step S52 corresponds to the number of thumbnail images to be displayed per window.

These thumbnail images may be held on a memory or storage medium (not shown) in association with the moving picture ID, scene IDs, and key frame numbers. When the thumbnails are held in this manner, they need not be generated every time step S54 is executed. Of course, as an initial search process, thumbnail images of all key frames may be generated and held in a memory or storage medium in association with the moving picture ID and the like, and a predetermined number of thumbnail images may be read out from the memory or storage medium upon display in response to each random display instruction.

The user repeats this random display instruction until he or she finds a scene similar to that included in a desired moving picture (step S55). If a similar rat key frame (desired key frame) is found, the user designates that desired key frame via the user operation module 206 to instruct to display similar frames (step S56). In response to this instruction, the flow advances to step S57 and subsequent steps, and the image processing apparatus is set in a similar frame display state 1201. At this time, the pattern matching module 211 executes matching of label sequences included in the color layouts of key frames included in the scene feature information storage module 204 using the designated key frame as a query key frame to compute similarity values with test key frames in each moving picture (step S57).

Figure 14:
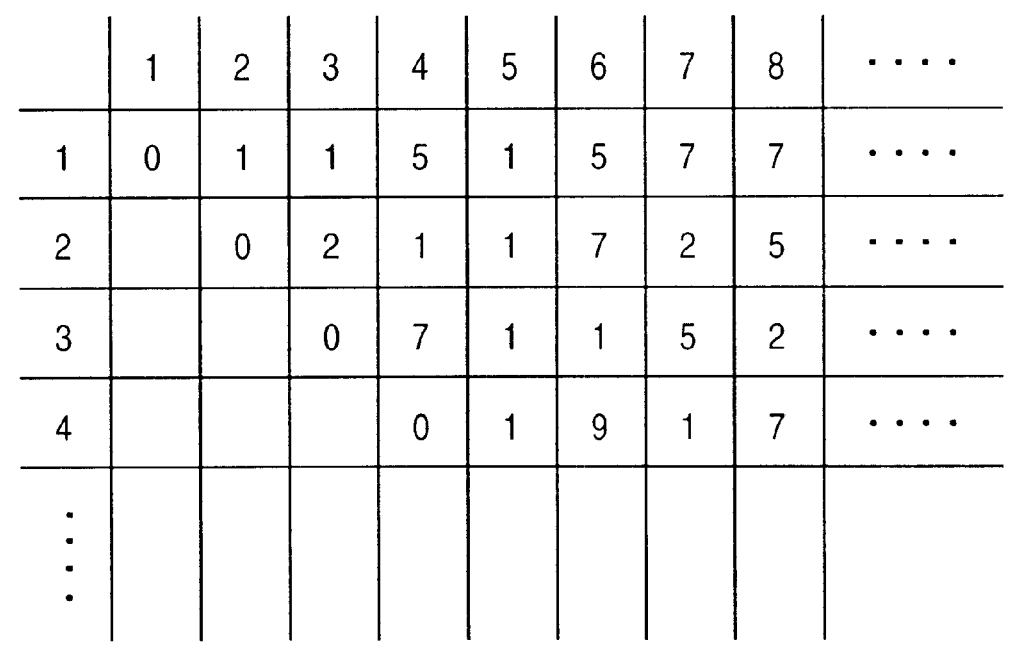

Upon computing similarity values, a matching process among label sequences described in, e.g., Japanese Patent Laid-Open No. 10-260983 can be used. This process will be briefly explained below. A penalty matrix shown in FIG. 14 is prepared. In this penalty matrix, penalties among labels are set to assign a small penalty (distance) to neighboring ones of color cells in the feature amount space shown in FIG. 5, and to assign a large penalty (distance) to distant color cells. The distance between the label sequences of the query key frame and test key frame is computed with reference to this penalty matrix to obtain a similarity value. Especially, to attain ambiguous pattern matching, DP matching used in voice recognition or the like, or fuzzy nondeterministic finite automaton disclosed in Japanese Laid-Open Patent No. 8-241335 may be used.

At this time, when query and test key frame images have different attribute information such as "the number of segmented blocks", or the like, data conversion of label sequences can be done based on their attribute information. For example, when the number of segmented blocks of a query key frame image is 3 ($2^3 \times 2^3 = 64$ blocks), that of a test key frame image is 2 ($2^2 \times 2^2 = 16$ blocks), and their color feature extraction methods both use "average color", labels in the query label sequence are temporarily converted into intermediate colors as the centers of gravity of corresponding cells in units of four labels, and the averages in units of four intermediate colors are computed to determine labels corresponding to these average colors as new labels. In this manner, the query label sequence can be converted into a label sequence including 16 labels as in the test label sequence.

After the similarity values with the key frames are obtained, corresponding thumbnail images are displayed as matches or search results via the display module 207 in descending order of similarity values (steps S58 and S59).

The user repeats these random display (step S60a) or similar frame display (step S60b) until he or she can obtain a key frame which seems to be a desired scene. When the user designates a thumbnail image of a key frame which seems to be a scene in the desired moving picture from the key frame similarity search results via the user operation module 206, and issues a playback instruction, the image processing apparatus is set in a moving picture playback state 1202 (step S61). At this time, the moving picture playback module 200 sequentially reads out frame images from the moving picture storage module 205 based on the key frame numbers of the corresponding moving picture with reference to the moving picture ID and key frame number stored in association with the designated key frame, and displays them via the display module 207 (step S63).

If the played-back scene is not the one included in the moving picture the user wants, the user instructs random display again (step S60a) to execute random display again or designates another thumbnail image as a query image (step 60b) to start similar scene display.

If the user determines that the played-back scene is the one included in the desired moving picture, he or she issues a digest playback instruction via the user operation module 206 to confirm the entire moving picture. When the digest playback instruction is issued (step S62), the image processing apparatus is set in a digest playback state 1203 (step S64). At this time, the digest playback module 212 informs the moving picture playback module 200 of the start to end frame numbers of all digest scenes with the same moving picture ID as that of the designated key frame with reference to the digest scene information in the digest scene information storage module 209. The moving picture playback module 200 sequentially reads out frames corresponding to the received start to end frame numbers from the moving picture storage module, and displays them via the display module 207. In this manner, a digest of the moving picture is displayed, and the user can confirm if the moving picture is a moving picture he or she wanted.

If the played-back digest is not the one of the desired moving picture, the user instructs random display or similar scene display using another thumbnail image as a query image again (step S60a, S60b). By repeating the aforementioned processes, the user can obtain a desired moving picture.

The aforementioned flow of the processes is an example, and a desired moving picture can be found by freely combining individual operations. For example, the user may input a digest playback instruction in the similar frame display state 1201, and may check the entire moving picture in the digest playback state 1203. Or the user may select a desired key frame in the key frame random display state 1200 to play back the moving picture or its digest.

As described above, according to the first embodiment, since information that pertains to important scenes of a given moving picture can be described in the scene feature data structure, key frame random display, key frame similarity search, digest automatic generation, and digest playback can be made, and the user can immediately locate a desired moving picture by desirably combining these operations. According to the scene feature data structure, moving pictures used in another image processing apparatus can be similarly processed.

Second Embodiment

In the digest moving picture generation process of the first embodiment, a digest scene is determined by changing the threshold value to fall within the designated time. However, the method of determining a digest scene in accordance with the designated time is not limited to such specific method. For example, the processing sequence shown in FIG. 15 may be used as another embodiment of that process.

Figure 15:
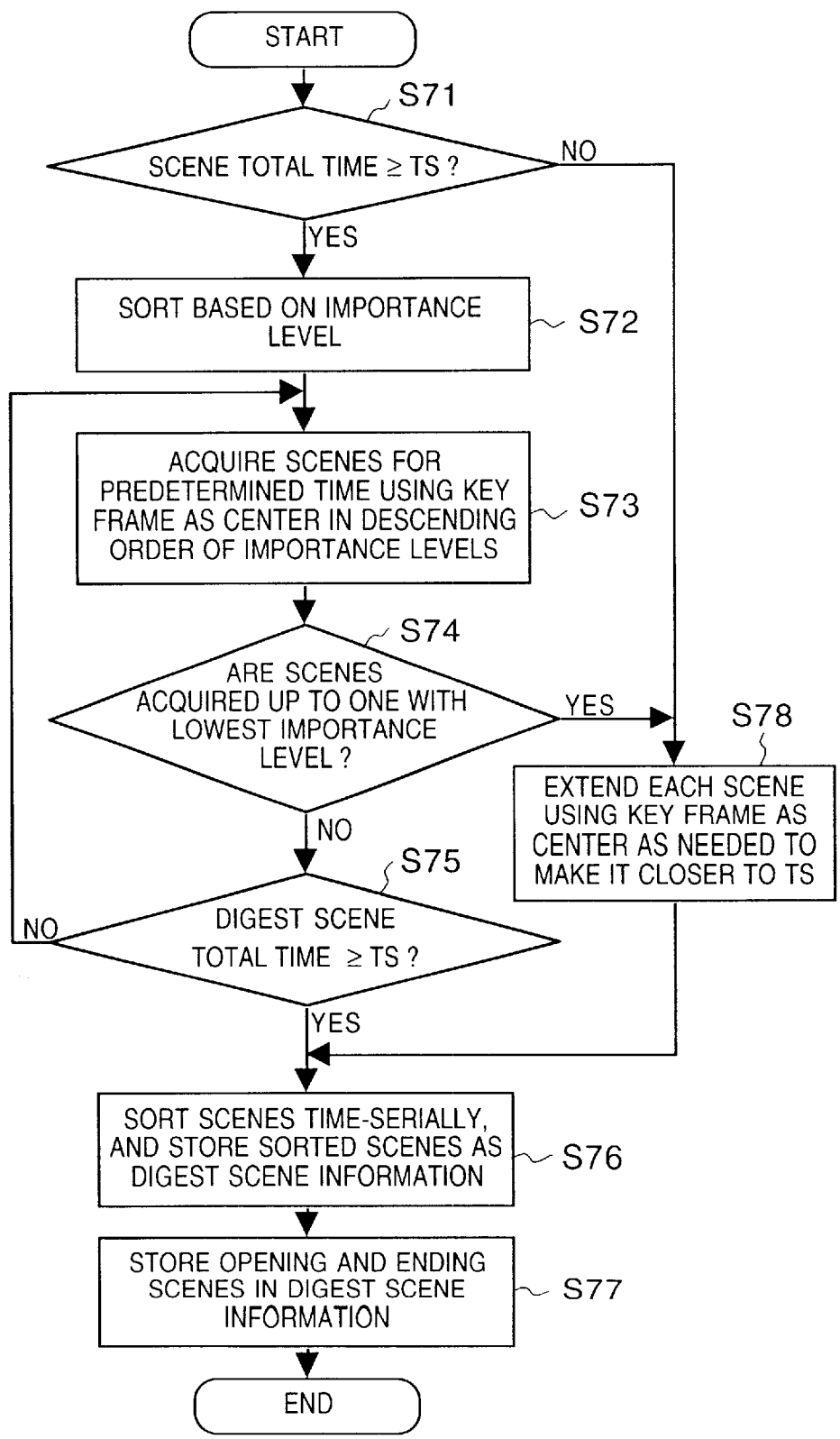
FIG. 15 is a flow chart showing the sequence of a digest moving picture generation process according to the second embodiment of the present invention.

FIG. 15 is a flow chart for explaining the sequence of a digest scene determination process according to the second embodiment. In step S71, the digest scene determination module 208 obtains the start and end frame numbers of all scene feature data having an identical moving picture ID with reference to the contents of the scene feature information storage module 204, and computes the total time of the scenes designated as important scenes of the moving picture of interest on the basis of the obtained start and end frame numbers. The module 208 compares this total time and a time TS obtained by subtracting the time required for the opening and ending scenes of the moving picture from a digest moving picture playback time (designated time) designated by the user. If the scene total time is longer than TS, since the digest playback time exceeds the designated time in this state, the flow advances to step S72 to adjust the playback time.

In step S72, scene feature data having an identical moving picture ID in the scene feature information are sorted in descending order of importance levels of scenes. In step S73, scenes are extracted in descending order of importance levels to fall within a predetermined time, and are determined as digest scenes. At this time, the predetermined time is determined to have an optimal duration that does not dazzle the human eye on the basis of the visual characteristics of a human being. Also, frames for the predetermined time are extracted from each scene to have the key frame as the center.

It is checked in step S74 if the process in step S73 has been done for a scene with the lowest importance level, i.e., for all the sorted important scenes. If the process in step S73 has been done for all pieces of scene feature information, this means that the digest playback time of the acquired scenes is equal to or shorter than the designated time, and the flow advances to step S78 to adjust to extend the playback time of each scene.

On the other hand, if it is determined in step S74 that the process in step S73 has not been done for all important scenes yet, the flow advances to step S75. It is checked in step S75 if the total time of digest scenes is equal to or longer than TS. If NO in step S75, step S73 (and S74) is repeated until the total time becomes equal to or longer than TS. When the total time of scenes becomes equal to or longer than TS, the flow advances to step S76. As a result, digest scenes can preferentially contain scenes with higher importance levels.

Step S78 as a process executed if it is determined in step S71 that the total time of scenes is shorter than TS, and if it is determined in step S74 that scenes have been acquired up to the one with the lowest importance level will be explained below. When the flow advances to step S78, the digest moving picture playback time is shorter than the time designated by the user. Therefore, in step S78 all scenes selected as the digest scenes are extended as needed to have their key frames as the center to make the playback time of these important scenes close to TS.

In step S76, scenes extracted as digest scenes are sorted time-serially, and are stored as digest scene information shown in, e.g., FIG. 11, in the digest scene information storage module 209. In step S77, the opening and ending scenes of the moving picture are respectively stored at the beginning and end of the digest scene information. At this time, if the frames of an important scene overlap those of the previous and next scenes, they are merged.

With the aforementioned processes, a digest moving picture can be automatically obtained.

Another Embodiment

In the above embodiments, digest moving pictures are generated by obtaining digest scene information of all moving pictures of interest, and temporarily storing the information on a storage medium. Alternatively, digest scene information of only a moving picture designated by a digest playback instruction may be generated on a memory. In this case, since the digest moving picture generation process described in the above embodiment is light, a digest moving picture can be immediately played back.

In the above embodiments, the scene feature extraction process and moving picture search process (and digest moving picture generation process) are implemented by a single image processing apparatus, but may be implemented by different image processing apparatuses as long as data having the scene feature data structure, original moving pictures, and a mechanism for associating them are available.

In the above embodiments, each frame position is expressed by a frame number (e.g., start frame number) assigned from the beginning of a moving picture. However, the present invention is not limited to this. For example, the playback time from the beginning of a moving picture may be used, as long as a given frame can be specified in a moving picture.

In the above embodiments, in the scene feature extraction process, the start and end frames, and key frame are manually determined, but may be determined automatically. For example, all frames in a moving picture may undergo feature extraction to obtain color layouts, and label sequences are compared between nearby frames to compute their similarity values. As the similarity value is lower, a change between neighboring frames is large, and a portion with such large change normally impresses the user. Using such fact, the importance levels of frames may be determined based on the similarity values.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, the contents of moving picture can be easily and adequately confirmed. Also, according to the data structure of the present invention, a plurality of image processing apparatuses can share information for confirming the contents.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:

specifying means for specifying at least one desired scene in moving picture data, and a frame serving as a key frame in the desired scene;

setting means for setting an importance level of the desired scene specified by said specifying means, with respect to the entire moving picture; and storage means for storing information indicating the scene and key frame specified by said specifying means and the importance level set by said setting means as scene information in association with the moving picture data.

2. The apparatus according to claim 1, wherein the information indicating the scene specified by said specifying means includes frame identifiers of start and end frames of the scene, and the information indicating the key frame includes a frame identifier of the key frame.

3. The apparatus according to claim 2, wherein the frame identifier is a frame number assigned in turn from the beginning of the moving picture data.

4. The apparatus according to claim 2, wherein the frame identifier is a time from the beginning to that frame of the moving picture data.

5. The apparatus according to claim 1, further comprising:

acquisition means for acquiring feature amount information of the key frame, and wherein the scene information stored in said storage means includes the feature amount information of the key frame image acquired by said acquisition means.

6. The apparatus according to claim 5, wherein the feature amount information of the key frame is a label sequence obtained by segmenting an image of the key frame into a plurality of blocks, assigning labels in accordance with feature amounts acquired from the individual segmented blocks, and arranging the assigned labels in a predetermined order.

7. The apparatus according to claim 6, wherein the image is segmented into a plurality of vertical and horizontal blocks, the numbers of which are given by powers of 2.

8. The apparatus according to claim 6, further comprising means for storing information that pertains to the number of segmented blocks, a feature amount extraction method, and a color expression of an image together with the label sequence.

9. The apparatus according to claim 5, further comprising:

computation means for computing a similarity value between images of a designated key frame and another key frame on the basis of image feature amounts of the key frames when one key frame is designated;

presentation means for presenting key frames on the basis of similarity values computed by said computation means; and playback means for acquiring and playing back moving picture data including the key frame selected from the key frames presented by said presentation means.

10. The apparatus according to claim 1, further comprising generation means for generating extracted moving picture data, which can be played back as a moving picture, on the basis of the scene information stored in said storage means.

11. The apparatus according to claim 10, wherein said generation means generates the extracted moving picture data by time-serially merging scenes indicated by the scene information stored in said storage means.

12. The apparatus according to claim 10, wherein said generation means generates the extracted moving picture data by time-serially merging scenes indicated by the scene information stored in said storage means, and opening and ending scenes of the moving picture for a predetermined time.

13. The apparatus according to claim 10, further comprising:

designation means for designating a playback time of the extracted moving picture data; and adjustment means for adjusting durations of scenes to be merged by s aid generation means on the basis of the playback time designated by said designation means.

14. The apparatus according to claim 13, wherein said adjustment means comprises:

frame extraction means for determining importance levels of frames in a scene on the basis of an importance level set in the scene, extracting frames having importance levels that exceed a threshold value from the scene, and providing the extracted frames as a scene to be merged to said generation means; and threshold value control means for controlling the threshold value used in said frame extraction means to make the playback time of the extracted moving picture data generated by said generation means fall within a predetermined error range of the designated playback time.

15. The apparatus according to claim 14, further comprising extension adjustment means for extending the playback time as needed using the key frame of each scene as the center to fall within a predetermined error range of the designated playback time when a total time of all scenes designated by the scene information is shorter than the playback time designated by said designation means.

16. The apparatus according to claim 10, further comprising removing means for removing a scene, having a playback time which is shorter than a predetermined time, from scenes that form the extracted moving picture data.

17. The apparatus according to claim 16, further comprising extending means for extending another scene by a time corresponding to the playback time of the scene removed by said removing means.

18. The apparatus according to claim 17, wherein said extending means extends a time of a scene set with a higher importance level of previous and next scenes which neighbor the scene removed by said removing means in the extracted moving picture data.

19. The apparatus according to claim 10, further comprising:
   designation means for designating a playback time of the extracted moving picture data; and
   extraction means for extracting scenes for a predetermined time duration by selecting scenes indicated by the scene information stored in said storage means in descending order of importance levels, and
   wherein said extraction means executes a process until a total time of the extracted scenes exceeds the playback time designated by said designation means, and
   said generation means generates the extracted moving picture data by time-serially merging the scenes extracted by said extraction means.

20. The apparatus according to claim 19, further comprising extension adjustment means for extending the playback time as needed using the key frame of each scene as the center to fall within a predetermined error range of the designated playback time when a total time of all scenes designated by the scene information is shorter than the playback time designated by said designation means.

21. The apparatus according to claim 10, wherein the scene information includes an image feature amount of an image of each key frame, and said apparatus further comprises:
   computation means for computing a similarity value between images of a designated key frame and another key frame on the basis of image feature amounts of the key frames when one key frame is designated;
   presentation means for presenting key frames on the basis of similarity values computed by said computation means; and
   playback means for playing back the extracted moving picture data generated by said generation means in association with the moving picture data which includes the key frame selected from the key frames presented by said presentation means.

22. The apparatus according to claim 21, wherein the feature amount information of the key frame is a label sequence obtained by segmenting an image of the key frame into a plurality of blocks, assigning labels in accordance with feature amounts acquired from the individual segmented blocks, and arranging the assigned labels in a predetermined order.

23. The apparatus according to claim 10, wherein the scene information includes an image feature amount of an image of each key frame, said apparatus further comprises:
   first means for randomly displaying key frames;
   second means for playing back the extracted moving picture data generated by said generation means;
   third means for mal king a similarity search by computing a similarity value between images of the designated key frame and another key frame on the basis of image feature amounts of the key frames; and
   fourth means for playing back a moving picture on the basis of the designated key frame, and
   said first to fourth means can operate to function in an arbitrary combination.

24. The apparatus according to claim 1, further comprising display means for displaying a list of thumbnails of key frame images.

25. An image processing method comprising:
   the specifying step of specifying at least one desired scene in moving picture data, and a frame serving as a key frame in the desired scene;
   the setting step of setting an importance level of the desired scene specified in the specifying step, with respect to the entire moving picture; and
   the storage step of storing information indicating the scene and key frame specified in the specifying step and the importance level set in the setting step as scene information in storage means in association with the moving picture data.

26. The method according to claim 25, wherein the information indicating the scene specified in the specifying step includes frame identifiers of start and end frames of the scene, and the information indicating the key frame includes a frame number of the key frame.

27. The method according to claim 26, wherein the frame identifier is a frame number assigned in turn from the beginning of the moving picture data.

28. The method according to claim 26, wherein the frame identifier is a time from the beginning to that frame of the moving picture data.

29. The method according to claim 25, further comprising:
   the acquisition step of acquiring feature amount information of the key frame, and
   wherein the scene information stored in the storage step includes the feature amount information of the key frame image acquired in the acquisition step.

30. The method according to claim 29, wherein the feature amount information of the key frame is a label sequence obtained by segmenting an image of the key frame into a plurality of blocks, assigning labels in accordance with feature amounts acquired from the individual segmented blocks, and arranging the assigned labels in a predetermined order.

31. The method according to claim 30, wherein the image is segmented into a plurality of vertical and horizontal blocks, the numbers of which are given by powers of 2.

32. The method according to claim 30, further comprising the step of storing information that pertains to the number of segmented blocks, a feature amount extraction method, and a color expression of an image together with the label sequence.

33. The method according to claim 29, further comprising:
   the computation step of computing a similarity value between images of a designated key frame and another key frame on the basis of image feature amounts of the key frames when one key frame is designated;
   the presentation step of presenting key frames on the basis of similarity values computed in the computation step; and the playback step of acquiring and playing back moving picture data including the key frame selected from the key frames presented in the presentation step.

34. The method according to claim 25, further comprising the generation step of generating extracted moving picture data, which can be played back as a moving picture, on the basis of the scene information stored in the storage means.

35. The method according to claim 34, wherein the generation step includes the step of generating the extracted moving picture data by time-serially merging scenes indicated by the scene information stored in the storage means.

36. The method according to claim 34, wherein the generation step includes the step of generating the extracted moving picture data by time-serially merging scenes indicated by the scene information stored in the storage means, and opening and ending scenes of the moving picture for a predetermined time.

37. The method according to claim 34, further comprising:
the designation step of designating a playback time of the extracted moving picture data; and
the adjustment step of adjusting durations of scenes to be merged in the generation step on the basis of the playback time designated in the designation step.

38. The method according to claim 37, wherein the adjustment step comprises:
the frame extraction step of determining importance levels of frames in a scene on the basis of an importance level set in the scene, extracting frames having importance levels that exceed a threshold value from the scene, and providing the extracted frames as a scene to be merged to the generation step; and
the threshold value control step of controlling the threshold value used in the frame extraction step to make the playback time of the extracted moving picture data generated in the generation step fall within a predetermined error range of the designated playback time.

39. The method according to claim 38, further comprising the extension adjustment step of extending the playback time as needed using the key frame of each scene as the center to fall within a predetermined error range of the designated playback time when a total time of all scenes designated by the scene information is shorter than the playback time designated in the designation step.

40. The method according to claim 34, further comprising the removing step of removing a scene, having a playback time which is shorter than a predetermined time, from scenes that form the extracted moving picture data.

41. The method according to claim 40, further comprising the extending step of extending another scene by a time corresponding to the playback time of the scene removed in the removing step.

42. The method according to claim 41, wherein the extending step includes the step of extending a time of a scene set with a higher importance level of previous and next scenes which neighbor the scene removed in the removing step in the extracted moving picture data.

43. The method according to claim 34, further comprising:
the designation step of designating a playback time of the extracted moving picture data; and
the extraction step of extracting scenes for a predetermined time duration by selecting scenes indicated by the scene information stored in the storage means in descending order of importance levels, and
wherein the extraction step includes the step of executing a process until a total time of the extracted scenes exceeds the playback time designated in the designation step, and the generation step includes the step of generating the extracted moving picture data by time-serially merging the scenes extracted in the extraction step.

44. The method according to claim 43, further comprising the extension adjustment step of extending the playback time as needed using the key frame of each scene as the center to fall within a predetermined error range of the designated playback time when a total time of all scenes designated by the scene information is shorter than the playback time designated in the designation step.

45. The method according to claim 34, wherein the scene information includes an image feature amount of an image of each key frame, and said method further comprises:
the computation step of computing a similarity value between images of a designated key frame and another key frame on the basis of image feature amounts of the key frames when one key frame is designated;
the presentation step of presenting key frames on the basis of similarity values computed in the computation step; and
the playback step of playing back the extracted moving picture data generated in the generation step in association with the moving picture data which includes the key frame selected from the key frames presented in the presentation step.

46. The method according to claim 45, wherein the feature amount information of the key frame is a label sequence obtained by segmenting an image of the key frame into a plurality of blocks, assigning labels in accordance with feature amounts acquired from the individual segmented blocks, and arranging the assigned labels in a predetermined order.

47. The method according to claim 34, wherein the scene information includes an image feature amount of an image of each key frame, and said method further comprises:
the first step of randomly displaying key frames;
the second step of playing back the extracted moving picture data generated in the generation step;
the third step of making a similarity search by computing a similarity value between images of the designated key frame and another key frame on the basis of image feature amounts of the key frames; and
the fourth step of playing back a moving picture on the basis of the designated key frame, and
the first to fourth steps can operate to function in an arbitrary combination.

48. The method according to claim 25, further comprising the display step of displaying a list of thumbnails of key frame images.

49. A storage medium for storing a control program that makes a computer implement a moving picture data storage process, said control program comprising:
a code of the specifying step of specifying at least one desired scene in moving picture data, and a frame serving as a key frame in the desired scene;
a code of the setting step of setting an importance level of the desired scene specified in the specifying step, with respect to the entire moving picture; and
a code of the storage step of storing information indicating the scene and key frame specified in the specifying step and the importance level set in the setting step as scene information in storage means in association with the moving picture data.

50. The medium according to claim 49, wherein said control program further comprises:
a code of the acquisition step of acquiring feature amount information of the key frame, and
wherein the scene information stored in the storage step includes the feature amount information of the key frame image acquired in the acquisition step.

51. The medium according to claim 50, wherein said control program further comprises:

a code of the computation step of computing a similarity value between images of a designated key frame and another key frame on the basis of image feature amounts of the key frames when one key frame is designated;

a code of the presentation step of presenting key frames on the basis of similarity values computed in the computation step; and a code of the playback step of acquiring and playing back moving picture data including the key frame selected from the key frames presented in the presentation step.

52. The medium according to claim 49, wherein said control program further comprises a code of the generation step of generating extracted moving picture data, which can be played back as a moving picture, on the basis of the scene information stored in the storage means.

53. The medium according to claim 52, wherein the scene information includes an image feature amount of an image of each key frame, and said control program further comprises:

a code of the computation step of computing a similarity value between images of a designated key frame and another key frame on the basis of image feature amounts of the key frames when one key frame is designated;

a code of the presentation step of presenting key frames on the basis of similarity values computed in the computation step; and a code of the playback step of playing back the extracted moving picture data generated in the generation step in association with the moving picture data which includes the key frame selected from the key frames presented in the presentation step.

54. A storage medium for storing moving picture data, said medium storing, in correspondence with the moving picture data, scene information, which includes:

scene specifying information for specifying at least one desired scene from the stored moving picture data;

key frame information representing a key frame of the scene specified by the scene specifying information; and an importance level set for each scene specified by the scene specifying information, with respect to the entire moving picture.

55. The medium according to claim 54, wherein the scene specifying information includes frame numbers of start and end frames of the scene, and the key frame information includes a frame number of the key frame.

56. The medium according to claim 54, wherein the key frame information includes a feature amount of a key frame image in the scene information.

\* \* \* \* \*

UNITED STATES PATENT AND TRADEMARK OFFICE
CERTIFICATE OF CORRECTION

PATENT NO. : 6,704,029 B1
DATED : March 9, 2004
INVENTOR(S) : Ikeda et al.

Page 1 of 1

It is certified that error appears in the above-identified patent and that said Letters Patent is hereby corrected as shown below:

Column 8,
Line 49, "shorter" should read -- shorter than --.

Column 14,
Line 42, "s aid" should read -- said --.

Column 15,
Line 64, "mal king" should read -- making --.

Signed and Sealed this

Thirty-first Day of August, 2004

JON W. DUDAS
*Director of the United States Patent and Trademark Office*